US011995502B2

(12) United States Patent
Cooper

(10) Patent No.: US 11,995,502 B2
(45) Date of Patent: May 28, 2024

(54) METHODS AND SYSTEMS FOR FACILITATING PLAYING SOCCER BASED ON RFID

(71) Applicant: Charles Cooper, San Pedro, CA (US)

(72) Inventor: Charles Cooper, San Pedro, CA (US)

( * ) Notice: Subject to any disclaimer, the term of this patent is extended or adjusted under 35 U.S.C. 154(b) by 0 days.

(21) Appl. No.: 17/729,577

(22) Filed: Apr. 26, 2022

(65) Prior Publication Data

US 2022/0350978 A1 Nov. 3, 2022

Related U.S. Application Data

(60) Provisional application No. 63/183,518, filed on May 3, 2021.

(51) Int. Cl.
*G06K 7/08* (2006.01)
*G06K 7/10* (2006.01)

(52) U.S. Cl.
CPC ................ *G06K 7/10366* (2013.01)

(58) Field of Classification Search
CPC ........... G06K 7/10366; G06K 19/0723; G06K 19/0701; G06K 7/10396; G06Q 10/0833; G06Q 10/0639
USPC ................ 235/451, 462.46, 472.02
See application file for complete search history.

(56) References Cited

U.S. PATENT DOCUMENTS

| 8,251,076 | B2 | 8/2012 | de Souza | |
|---|---|---|---|---|
| 9,339,715 | B2* | 5/2016 | Luciano, Jr. | ........ G06Q 30/0212 |
| 9,740,899 | B1 | 8/2017 | Shah | |
| 10,589,162 | B2 | 3/2020 | Koo | |
| 10,799,770 | B1 | 10/2020 | Semsak | |
| 10,926,145 | B2 | 2/2021 | Michaelson | |
| 2021/0106907 | A1* | 4/2021 | Reising | .............. A63B 71/0622 |

FOREIGN PATENT DOCUMENTS

CN 105288963 2/2016

* cited by examiner

*Primary Examiner* — Daniel St Cyr
(74) *Attorney, Agent, or Firm* — Maier & Maier, PLLC

(57) ABSTRACT

The present invention provides methods and systems for facilitating playing soccer based on RFID. The methods and systems may include receiving a request from a user, generating a radio tracking indication, transmitting the radio tracking indication to a Radio Frequency Identification (RFID) reader, emitting interrogating radio waves, receiving returned radio wave, generating ball tracking data, receiving target data from at least one target sensor, retrieving game data, processing the ball tracking data and the target data based on the game data, generating user performance, transmitting the user performance to the user, storing at least one of the request, the sensor data, the target sensor data, and the user performance.

20 Claims, 6 Drawing Sheets

METHODS AND SYSTEMS FOR FACILITATING PLAYING SOCCER BASED ON RFID

FIELD OF THE INVENTION

The present invention relates generally to games, toys, and sports goods. More specifically, the present invention is Methods and systems for facilitating playing soccer based on RFID.

BACKGROUND OF THE INVENTION

The field of games, toys and sports goods is technologically important to several industries, business organizations, and/or individuals.

Radio-frequency identification (RFID) is a method for the identification and tracking of assets without the need for line-of-sight between the reader and the tag. An RFID tag may include a radio receiver and transmitter that enables it to respond to an interrogation signal (radio waves) emitted by RFID readers. Further, passive RFID tags may be powered by the interrogation signal itself and do not require an external power source. The frequency range for radio waves is further categorized into low, high, and ultra-high frequency (UHF) ranges.

Due to its out-of-sight capabilities, RFID has been a literal game-changer. RFID technology has been applied to nearly every sport such as golf, soccer, etc. that involves the motion of the ball. Further, RFID has been successfully employed to monitor sports equipment.

Therefore, there is a need for improved methods and systems for facilitating playing soccer based on RFID that may overcome one or more of the above-mentioned problems and/or limitations.

SUMMARY OF THE INVENTION

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

According to some embodiments, a method for facilitating playing soccer based on RFID is disclosed. Accordingly, the method may include receiving, using a communication device, a request from at least one user device associated with at least one user. Further, the method may include generating, using a processing device, a radio tracking indication based on the receiving of the request. Further, the method may include transmitting, using the communication device, the radio tracking indication to a Radio Frequency Identification (RFID) reader (or writer). Further, the method may include emitting, using an RFID antenna, interrogating radio waves based on the transmitting of the radio tracking indication. Further, the RFID antenna may be communicatively coupled to the RFID reader. Further, the method may include receiving, using the RFID antenna, returned radio wave from at least one RFID tag disposed on the at least one ball. Further, the method may include generating, using the RFID reader, ball tracking data based on the returned radio wave. Further, the method may include receiving, using the communication device, target data from at least one target sensor disposed on at least one target. Further, the method may include retrieving, using a storage device, game data corresponding to the game type indication. Further, the method may include processing, using the processing device, the ball tracking data and the target data based on the game data. Further, the method may include generating, using the processing device, user performance based on the processing. Further, the method may include transmitting, using the communication device, the user performance to the at least one user device. Further, the method may include storing, using a storage device, at least one of the request, the sensor data, the target sensor data, and the user performance.

According to some aspects, a system for facilitating playing soccer based on RFID is disclosed. Accordingly, the system may include a communication device configured for receiving a request from at least one user device associated with at least one user. Further, the communication device may be configured for transmitting a radio tracking indication to a Radio Frequency Identification (RFID) reader (or writer). Further, the communication device may be configured for receiving target data from at least one target sensor disposed on at least one target. Further, the communication device may be configured for transmitting the user performance to the at least one user device. Further, the system may include a processing device configured for generating the radio tracking indication based on the receiving of the request. Further, the processing device may be configured for processing the ball tracking data and the target data based on game data. Further, the processing device may be configured for generating the user performance based on the processing. Further, the system may include an RFID antenna configured for emitting interrogating radio waves based on the transmitting of the radio tracking indication. Further, the RFID antenna may be configured for receiving returned radio waves from at least one RFID tag disposed on the at least one ball. Further, the system may include the RFID reader configured for generating ball tracking data based on the returned radio wave. Further, the system may include a storage device configured for retrieving the game data corresponding to the game type indication. Further, the game data may include rules and scoring criteria of the game type. Further, the storage device may be configured for storing at least one of the request, the sensor data, the target sensor data, and the user performance.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and subcombinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAIL DESCRIPTIONS OF THE INVENTION

Figure 1:
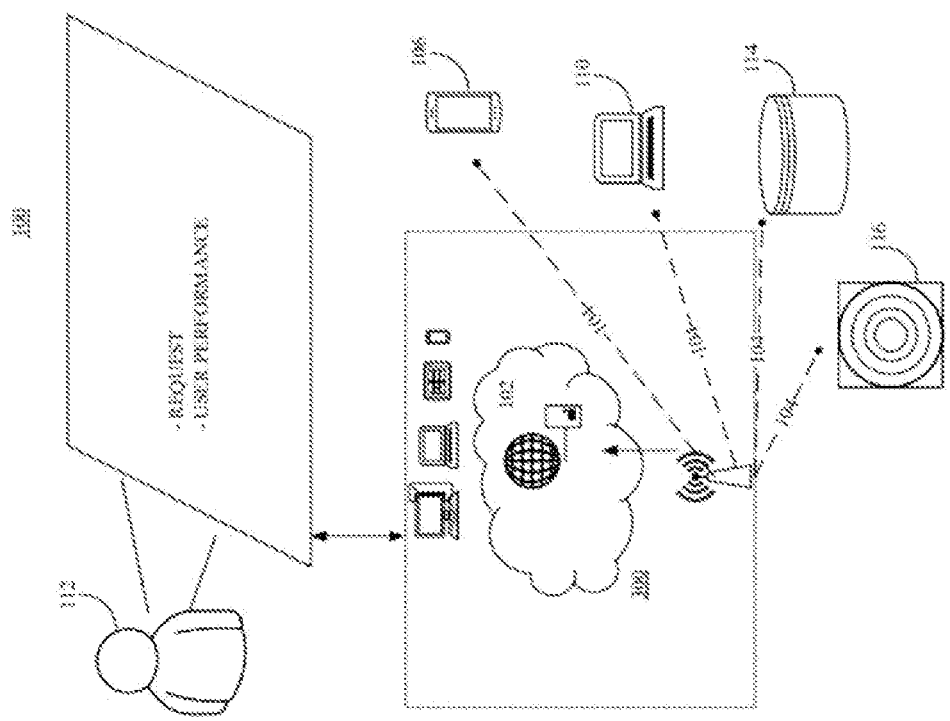
FIG. 1 is an illustration of an online platform consistent with various embodiments of the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of Methods and systems for facilitating playing soccer based on RFID, embodiments of the present disclosure are not limited to use only in this context.

Overview

The present disclosure describes methods and systems for facilitating playing soccer based on RFID. Further, a user (or player) may kick a soccer ball or any ball that can be kicked through targets on a field that uses RFID (Radio Frequency Identification) so the player gets points and can track their scores based on the distance the user kicks the ball and which target the user kicks it in using RFID technology in the balls and each target. Further, the each target may include sensors.

Once the player kicks a ball, antennas and RFID sensors in the field targets and ball determine a player score based on certain games. Further, in an instance, one game of the certain games may be based on distance (e.g., distance-based soccer). Further, a second game of the certain games may be based on which targets are hit in the bigger target (e.g., a target-based soccer game).

Referring now to figures, FIG. 1 is an illustration of an online platform 100 consistent with various embodiments of the present disclosure. By way of non-limiting example, the online platform 100 for facilitating playing soccer based on RFID may be hosted on a centralized server 102, such as, for example, a cloud computing service. The centralized server 102 may communicate with other network entities, such as, for example, a mobile device 106 (such as a smartphone, a laptop, a tablet computer, etc.), other electronic devices 110 (such as desktop computers, server computers, etc.), databases 114, and sensors 116, over a communication network 104, such as, but not limited to, the Internet. Further, users of the online platform 100 may include relevant parties such as, but not limited to, end-users, service providers, and administrators. Accordingly, in some instances, electronic devices operated by the one or more relevant parties may be in communication with the online platform 100.

A user 112, such as the one or more relevant parties, may access the online platform 100 through a web-based software application or browser. The web-based software application may be embodied as, for example, but not be limited to, a website, a web application, a desktop application, and a mobile application compatible with a computing device 300.

Figure 2:
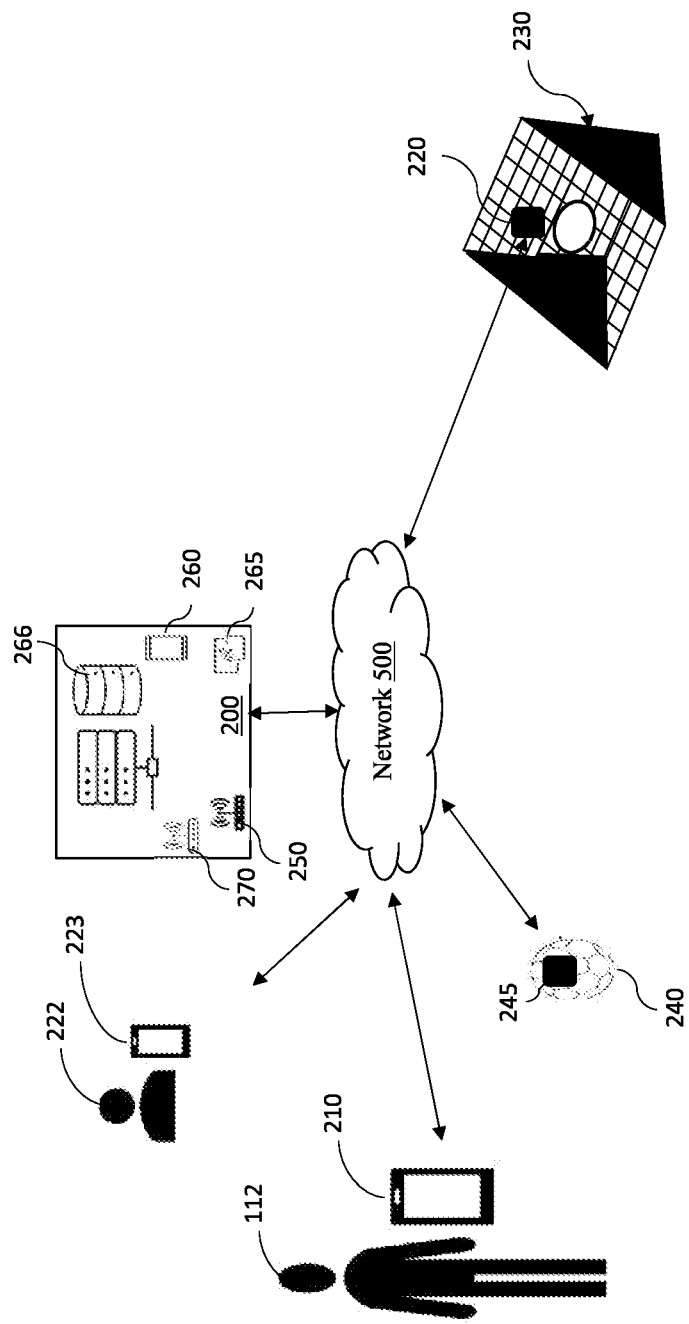
FIG. 2 illustrates a system in a network environment with a target, in accordance with some embodiments.

Further, the online platform 100 may include a system 200 for facilitating playing soccer based on RFID is disclosed. Accordingly, as shown in FIG. 2, the system 200 may include a communication device 250 configured for receiving a request from at least one user device 210 associated with at least one user. Further, the request may include an indication of the at least one user 112 that may want to play soccer. Further, the at least one user 112 may include an individual. Further, the at least one user device 210 may include a smartphone, a mobile, a tablet, a personal laptop, a laptop, and so on. Further, the request may include a game type indication corresponding to a game type of soccer that the at least one user 112 may want to play. Further, the game type indication may be associated with distance-based soccer, target-based soccer game, etc. Further, the communication device 250 may be configured for transmitting a radio tracking indication to a Radio Frequency Identification (RFID) reader (or writer).

Figure 3:
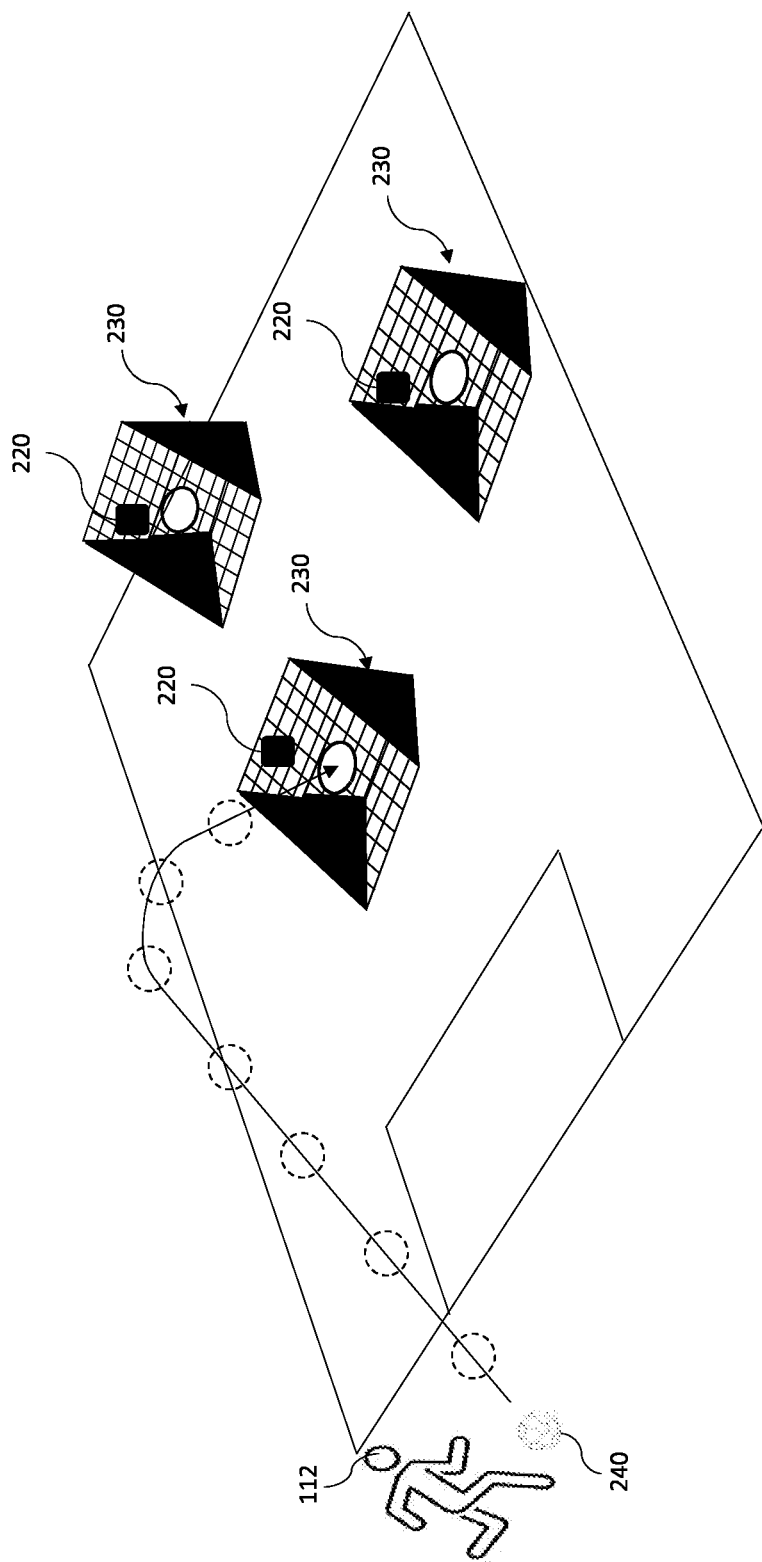
FIG. 3 illustrates a soccer field with multiple targets, in accordance with some embodiments.

FIG. 3 illustrates a soccer field with targets 230, in accordance with some embodiments.

The communication device 250 may be configured for receiving target data from at least one target sensor 220 disposed on at least one target 230. Further, the at least one target 230 may be located throughout a soccer field (as shown in FIG. 3). Further, the at least one target sensor 220 may be configured for detecting the presence of the at least one ball 240 in the at least one target 230. Further, the communication device 250 may be configured for transmitting the user performance to the at least one user device 210.

Further, the system 200 may include a processing device 260 configured for generating the radio tracking indication based on the receiving of the request. Further, the radio-tracking indication may correspond to the generation of radio waves for facilitating tracking of at least one ball 240 that may be kicked by the at least one user 112 for playing soccer. Further, the at least one ball 240 may include a football or an inflatable ball, etc. Further, the processing device 260 may be configured for processing the ball tracking data and the target data based on game data. Further, the processing device 260 may be configured for generating the user performance based on the processing. Further, the user performance may include a score corresponding to the at least one user 112. Further, the user performance may include performance parameters that may include speed, accuracy, force, motion trajectory of the at least one ball that may be kicked by the user.

Further, the system 200 may include an RFID antenna configured for emitting interrogating radio waves based on the transmitting of the radio tracking indication. Further, the RFID antenna 270 may be communicatively coupled to an RFID reader. Further, the RFID antenna 270 may be configured for receiving returned radio waves from at least one RFID tag 245 disposed on the at least one ball 240. Further, the at least one RFID tag 245 may include at least one sensor configured for detecting ball parameters associated with the at least one ball 240. Further, the at least one sensor may include at least one of a location sensor, an orientation sensor, a force sensor, a multiaxis accelerometer, an altitude sensor, and so on. Further, the at least one sensor may be configured for generating sensor data.

Further, the system 200 may include the RFID reader 265 configured for generating ball tracking data based on the returned radio wave. Further, the RFID reader 265 may be communicatively coupled to the processing device 260. Further, the ball tracking data may include the sensor data.

Further, the system 200 may include a storage device 266 configured for retrieving the game data corresponding to the game type indication. Further, the game data may include rules and scoring criteria of the game type. Further, the storage device 266 may be configured for storing at least one of the request, the sensor data, the target sensor data, and the user performance.

Figure 5:
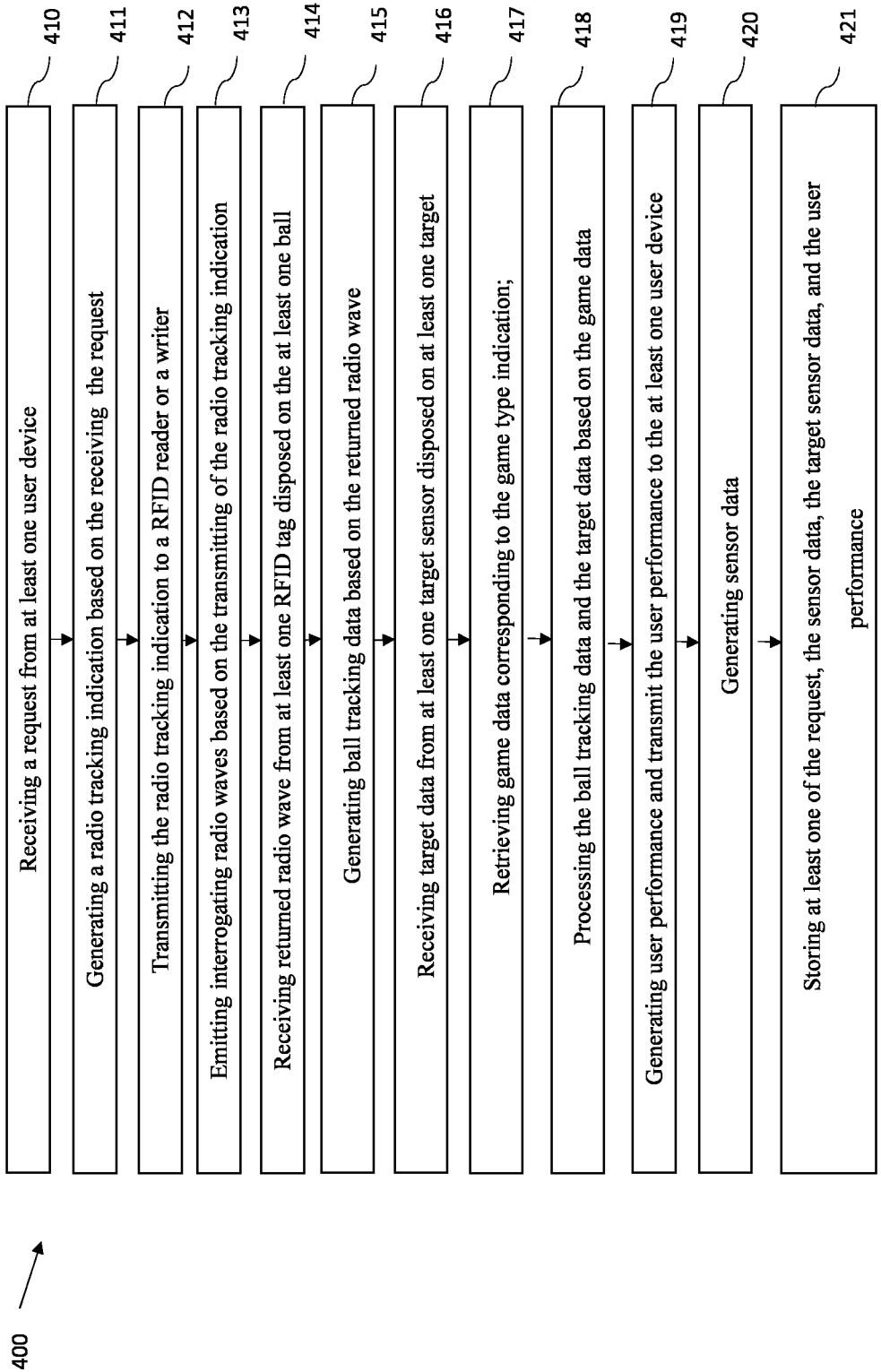
FIG. 5 is a simplified flow diagram illustrating an example operation of the present invention.

Further, a method for facilitating playing soccer based on RFID is disclosed. Turning to FIG. 5, FIG. 5 is a simplified flow diagram illustrating example processes of an example operation 400 of the present invention.

At 410, the present invention may include a process for receiving a request from at least one user device 210.

At 411, the present invention may include a process for generating a radio tracking indication based on the receiving the request.

At 412, the present invention may include a process for transmitting the radio tracking indication to a RFID reader or a writer 265.

At 413, the present invention may include a process for emitting interrogating radio waves based on the transmitting of the radio tracking indication.

At 414, the present invention may include a process for receiving returned radio wave from at least one RFID tag 245 disposed on the at least one ball 240.

At 415, the present invention may include a process for generating ball tracking data based on the returned radio wave.

At 416, the present invention may include a process for receiving target data from at least one target sensor 220 disposed on at least one target 230.

At 417, the present invention may include a process for retrieving game data corresponding to the game type indication.

At 418, the present invention may include a process for processing the ball tracking data and the target data based on the game data.

At 419, the present invention may include a process for generating user performance and transmit the user performance to the at least one user device 210.

At 420, the present invention may include a process for generating sensor data.

At 421, the present invention may include a process for storing at least one of the request, the sensor data, the target sensor data, and the user performance.

Accordingly, the method may include receiving, using a communication device 250, a request from at least one user device 210 associated with at least one user 112. Further, the request may include an indication of the at least one user 112 that may want to play soccer. Further, the at least one user 112 may include an individual. Further, the at least one user device 210 may include a smartphone, a mobile, a tablet, a personal laptop, a laptop, and so on. Further, the request may include a game type indication corresponding to a game type of soccer that the at least one user may want to play. Further, the game type indication may be associated with distance-based soccer, target-based soccer game, etc. Further, the game type may include the at least one user hitting each target of the at least one target on the soccer field.

Further, the method may include generating, using a processing device 260, a radio tracking indication based on the receiving of the request. Further, the radio-tracking indication may correspond to the generation of radio wave for facilitating tracking of at least one ball 240 that may be kicked by the at least one user for playing soccer. Further, the at least one ball 240 may include a football or an inflatable ball, etc.

Further, the method may include transmitting, using the communication device 250, the radio tracking indication to a Radio Frequency Identification (RFID) reader (or writer) 265.

Further, the method may include emitting, using an RFID antenna 270, interrogating radio waves based on the transmitting of the radio tracking indication. Further, the RFID antenna 270 may be communicatively coupled to the RFID reader 265. Further, a frequency range for the interrogating radio waves may be categorized into low, high, and ultra-high frequency (UHF) ranges.

Further, the method may include receiving, using the RFID antenna 270, returned radio wave from at least one RFID tag 245 disposed on the at least one ball 240. Further, the at least one RFID tag 245 may include at least one sensor configured for detecting ball parameters associated with the at least one ball 240. Further, the at least one sensor may include at least one of a location sensor, an orientation sensor, a force sensor, a multiaxis accelerometer, an altitude sensor, and so on. Further, the at least one sensor may be configured for generating sensor data.

Further, the method may include generating, using the RFID reader 240, ball tracking data based on the returned radio wave. Further, the RFID reader 240 may be communicatively coupled to the processing device 260. Further, the ball tracking data may include the sensor data.

Further, the method may include receiving, using the communication device 250, target data from at least one target sensor 220 disposed on at least one target 230. Further, the at least one target 230 may be located throughout a soccer field (as shown in FIG. 3). Further, the at least one target sensor may be configured for detecting the presence of the at least one ball 240 in the at least one target 230.

Further, the method may include retrieving, using a storage device 266, game data corresponding to the game type indication. Further, the game data may include rules and scoring criteria of the game type.

Further, the method may include processing, using the processing device 260, the ball tracking data and the target data based on the game data.

Further, the method may include generating, using the processing device 260, user performance based on the processing. Further, the user performance may include a score corresponding to the at least one user 112. Further, the user performance may include performance parameters that may include speed, accuracy, force, motion trajectory of the at least one ball 240 that may be kicked by the user 112.

Further, the method may include transmitting, using the communication device 250, the user performance to the at least one user device 210.

Further, the method may include storing, using the storage device 266, at least one of the request, the sensor data, the target sensor data, and the user performance.

Further, in some embodiments, the method may include retrieving, using the storage device 266, an artificial intelligence model. Further, the artificial learning model may include a machine learning model. Further, the processing may be based on the artificial learning model. Further, the method may include generating, using the processing device 260, a game suggestion based on the processing. Further, the game suggestion may include an advice for the at least one user 112. Further, the advice may improve a gameplay of the at least one user 112. Further, the method may include transmitting, using the communication device 250, the game suggestion to the at least one user device 210. Further, the method may include storing, using the storage device, the game suggestion.

Figure 4:
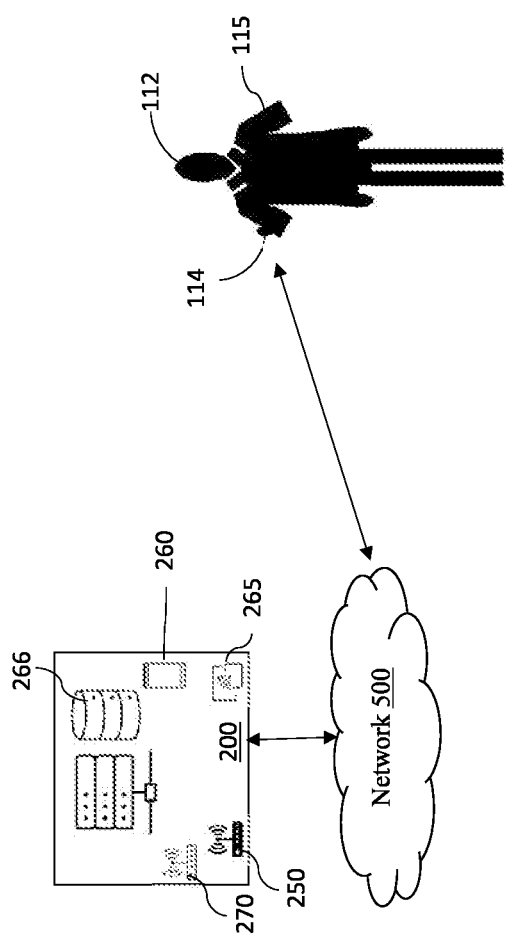
FIG. 4 illustrates an RFID sensor disposed on one apparel of one user, in accordance with some embodiments.

Further, in some embodiments, the method may include receiving, using the communication device 250, user identification data from an input device. Further, the input device may include an RFID sensor 114 that may be disposed on at least one apparel 115 of the at least one user 112, as shown in FIG. 4. Further, the at least one apparel 115 may include a shoelace, a shoe, a t shirt, a trouser, etc. Further, the ball parameters may include ball identification data. Further, the ball identification data may facilitate identification of the ball 240. Further, the method may include analyzing, using the processing device 260, the user identification data and the ball identification data to generate an association indication. Further, the method may include associating, using the processing device 260, the user identification data to the ball identification data based on the association indication. Further, the association indication may facilitate registration of the at least one ball 240 with the at least one user 112. Further, the method may include transmitting, using the communication device 250, the association indication to the at least one user device 210. Further, the method may include storing, using the storage device 266, the association indication. Further, in some embodiments, the method may include receiving, using the communication device 250, user data from the at least one user device 210. Further, the user data may include a name, an address, an email id, etc. Further, the method may include analyzing, using the processing device 260, the user data to generate a user profile. Further, the user profile may include user credentials that may include a user name and a password. Further, the method may include transmitting, using the communication device 250, the user credentials to the at least one user device 210. Further, the user profile may include at least one of the association indication, the user performance, and the game suggestion. Further, the method may include storing, using the storage device 266, the user profile suggestion.

Further, in some embodiments, the method may include analyzing, using the processing device 260, at least one of the user performance and the game suggestion to generate a game insight. Further, the game insight may include a measure of performance of the gameplay of the at least one user over a predetermined period of time. Further, the game insight may facilitate tracking progress of the gameplay of the at least one user 112.

Further, in some embodiments, the method may include receiving, using the communication device 250, a service request from at least one second user device 223 associated with at least one second user 222. Further, the service request may be associated with at least one service that may include marketing, account management, product development, etc. Further, the at least one second user 222 may include a management authority responsible for allowing the gameplay in the soccer field. Further, the management authority may include an individual, an institution, and an organization that may want to receive the at least one service. Further, the at least one second user device 223 may include a smartphone, a mobile, a tablet, a personal laptop, a laptop, and so on. Further, the method may include retrieving, using the storage device 266, service resources associated with the service request. Further, the service resources may include instructional content for facilitating provisioning of the at least one service. Further, the method may include transmitting, using the communication device 250, the service resources to the at least one second user device 223.

Figure 6:
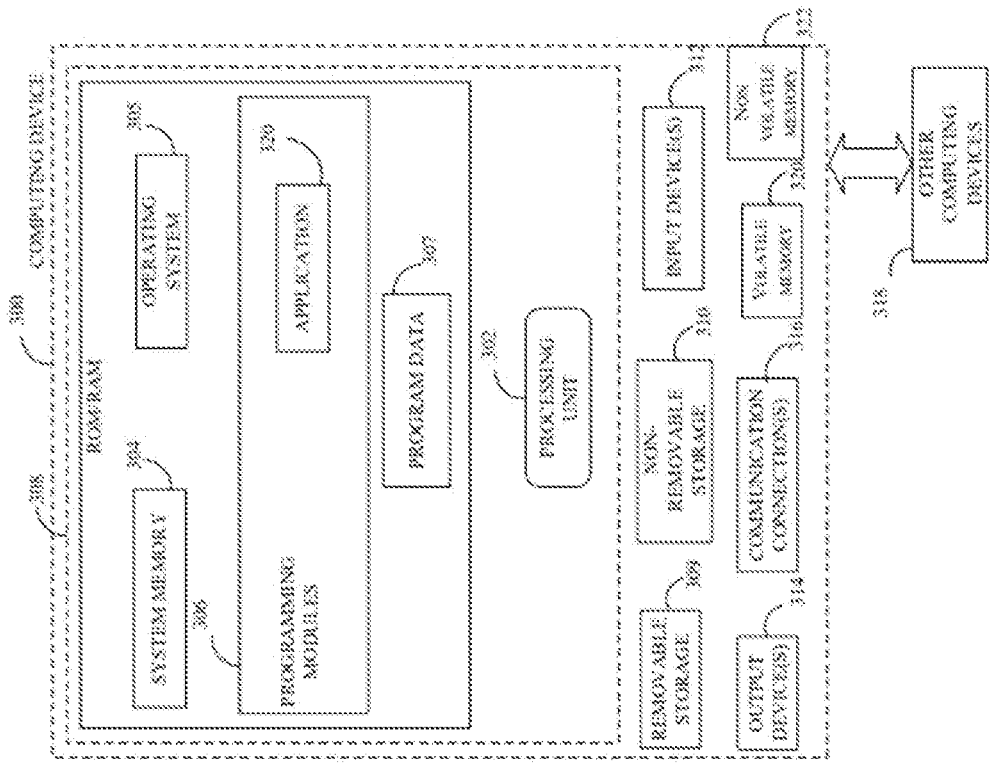
FIG. 6 is a block diagram of a computing device for implementing the methods disclosed herein, in accordance with some embodiments.

With reference to FIG. 6, a system 200 consistent with an embodiment of the disclosure may include a computing device or cloud service, such as computing device 300. In a basic configuration, computing device 300 may include at least one processing unit 302 and a system memory 304. Depending on the configuration and type of computing device, system memory 304 may comprise, but is not limited to, volatile (e.g. random-access memory (RAM)), non-volatile (e.g. read-only memory (ROM)), flash memory, or any combination. System memory 304 may include operating system 305, one or more programming modules 306, and may include a program data 307. Operating system 305, for example, may be suitable for controlling computing device 300's operation. In one embodiment, programming modules 306 may include image-processing module, machine learning module and/or image classifying module. Furthermore, embodiments of the disclosure may be practiced in conjunction with a graphics library, other operating systems, or any other application program and is not limited to any particular application or system. This basic configuration is illustrated in FIG. 6 by those components within a dashed line 308.

Computing device 300 may have additional features or functionality. For example, computing device 300 may also include additional data storage devices (removable and/or non-removable) such as, for example, magnetic disks, optical disks, or tape. Such additional storage is illustrated in FIG. 6 by a removable storage 309 and a non-removable storage 310. Computer storage media may include volatile and nonvolatile, removable, and non-removable media implemented in any method or technology for storage of information, such as computer-readable instructions, data structures, program modules, or other data. System memory 304, removable storage 309, and non-removable storage 310 are all computer storage media examples (i.e., memory storage.) Computer storage media may include, but is not limited to, RAM, ROM, non-volatile storage 322, volatile storage 320 electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 300. Any such computer storage media may be part of device 300. Computing device 300 may also have input device(s) 312 such as a keyboard, a mouse, a pen, a sound input device, a touch input device, a location sensor, a camera, a biometric sensor, etc. Output device(s) 314 such as a display, speakers, a printer, etc. may also be included. The aforementioned devices are examples and others may be used.

Computing device 300 may also contain a communication connection 316 that may allow device 300 to communicate with other computing devices 318, such as over a network 500 in a distributed computing environment, for example, an intranet or the Internet. Communication connection 316 is one example of communication media. Communication media may typically be embodied by computer-readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer-readable media as used herein may include both storage media and communication media.

As stated above, a number of program modules and data files may be stored in system memory 304, including operating system 305. While executing on processing unit 302, programming modules 306 (e.g., application 320 such as a media player) may perform processes including, for example, one or more stages of methods, algorithms, systems, applications, servers, databases as described above. The aforementioned process is an example, and processing unit 302 may perform other processes. Other programming modules that may be used in accordance with embodiments of the present disclosure may include sound encoding/decoding applications, machine learning application, acoustic classifiers, etc.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general-purpose graphics processor-based systems, multiprocessor systems, microprocessor-based or programmable consumer electronics, application-specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer-readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid-state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Although the invention has been explained in relation to its preferred embodiment, it is to be understood that many other possible modifications and variations can be made without departing from the spirit and scope of the invention.

What is claimed is:

1. A non-transitory computer readable medium containing computer-readable instructions stored therein for causing a computer processor to perform operations to:
receive a request from at least one user device associated with at least one user; the request includes an indication of the at least one user and a game type indication;
generate a radio tracking indication based on the receiving the request; transmit the radio tracking indication to a RFID reader or a writer;
emit interrogating radio waves based on the transmitting of the radio tracking indication;
receive returned radio wave from at least one RFID tag disposed on the at least one ball;
generate ball tracking data based on the returned radio wave;
receive target data from at least one target sensor disposed on at least one target, the target having at least a point hole, and the at least one target sensor configured for detecting the presence of the at least one ball in the at least one target point hole;
retrieve game data corresponding to the game type indication;
process the ball tracking data and the target data based on the game data generate user performance and transmit the user performance to the at least one user device;
generate sensor data; and
store at least one of the request, the sensor data, the target sensor data, and the user performance.

2. The non-transitory computer readable medium as claimed in claim 1, wherein the game type indication is associated with a distance-based soccer.

3. The non-transitory computer readable medium as claimed in claim 1, wherein the game type indication is associated with a target-based soccer game.

4. The non-transitory computer readable medium as claimed in claim 1, wherein the user performance includes a score corresponding to the at least one user.

5. The non-transitory computer readable medium as claimed in claim 1, wherein the user performance includes performance parameters that include speed, accuracy, and force.

6. The non-transitory computer readable medium as claimed in claim 1, wherein the user performance includes performance parameters that include motion trajectory of the at least one ball kicked by the user.

7. A method comprising:
receiving, using a communication device, a request from at least one user device associated with at least one user, the request includes an indication of the at least one user and a game type indication associated with a distance-based soccer;
generating, using a processing device, a radio tracking indication based on the receiving the request;
transmitting, using the communication device, the radio tracking indication to a RFID reader or writer;
emitting, using an RFID antenna, interrogating radio waves based on the transmitting of the radio tracking indication, the RFID antenna is communicatively coupled to the RFID reader;
receiving, using the RFID antenna, returned radio wave from at least one RFID tag disposed on the at least one ball, the at least one RFID includes at least one sensor configured for detecting ball parameters associated with the at least one ball, the at least one sensor includes at least one location sensor, orientation sensor, force sensor, multiaxis accelerometer, altitude sensor, the at least one sensor is configured for generating sensor data;
generating, using the RFID reader, ball tracking data based on the returned radio wave, the RFID reader is communicatively coupled to the processing device, the ball tracking data includes the sensor data;
receiving, using the communication device, target data from at least one target sensor disposed on at least one target, the target having at least a point hole, and the at least one target sensor configured for detecting the presence of the at least one ball in the at least one target point hole;
retrieving, using a storage device, game data corresponding to the game type indication, the game data includes rules and scoring criteria;

processing, using the processing device, the ball tracking data and the target data based on the game data;

generating, using the processing device, user performance based on the processing, the user performance includes a score corresponding to the at least one user, performance parameters that include speed, accuracy, force, motion trajectory of the at least one ball kicked by the user;

transmitting, using the communication device, the user performance to the at least one user device; and storing, using the storage device, at least one of the request, the sensor data, the target sensor data, and the user performance.

8. The method as claimed in claim 7, wherein the method further includes generating, using the processing device, a game suggestion based on the processing, the game suggestion includes an advice for the at least one user;

transmitting, using the communication device, the game suggestion to the at least one user device;

storing, using the storage device, the game suggestion;

receiving, using the communication device, user identification data from an input device, the input device includes an RFID sensor disposed on at least one apparel of the at least one user;

receiving, using the communication device, the ball parameters that include ball identification data to facilitate identification of the ball;

analyzing, using the processing device, the user identification data and the ball identification data to generate an association indication;

associating, using the processing device, the user identification data to the ball identification data based on the association indication;

transmitting, using the communication device, the association indication to the at least one user device;

storing, using the storage device, the association indication;

receiving, using the communication device, user data from the at least one user device, the user data includes a name, an address, and an email id;

analyzing, using the processing device, the user data to generate a user profile, the user profile includes user credentials;

transmitting, using the communication device, the user credentials to the at least one user device, the user profile includes at least one of the association indication, the user performance, and the game suggestion; and storing, using the storage device, the user profile suggestion.

9. The method as claimed in claim 8, wherein the at least one apparel includes a shoelace.

10. The method as claimed in claim 8, wherein the at least one apparel includes a shoe.

11. The method as claimed in claim 8, wherein the at least one apparel includes at shirt.

12. The method as claimed in claim 8, wherein the at least one apparel includes a trouser.

13. The method as claimed in claim 8, wherein the method further includes analyzing, using the processing device, at least one of the user performance and the game suggestion to generate a game insight that includes a measure of performance of the at least one user over a predetermined period of time;

receiving, using the communication device, a service request from at least one second user device associated with at least one second user, the service request is associated with at least one service that includes marketing, account management, product development;

retrieving, using the storage device, service resources associated with the service request, the service resources includes instructional content;

transmitting, using the communication device, the service resources to the at least one second user device.

14. The method as claimed in claim 8, wherein the user performance includes a score corresponding to the at least one user.

15. The method as claimed in claim 8, wherein the user performance includes performance parameters that include speed, accuracy, and force.

16. The method as claimed in claim 8, wherein the user performance includes performance parameters that include motion trajectory of the at least one ball kicked by the user.

17. A method comprising:

receiving, using a communication device, a request from at least one user device associated with at least one user, the request includes an indication of the at least one user and a game type indication associated with a target-based soccer game;

generating, using a processing device, a radio tracking indication based on the receiving the request;

transmitting, using the communication device, the radio tracking indication to a RFID reader or writer;

emitting, using an RFID antenna, interrogating radio waves based on the transmitting of the radio tracking indication, the RFID antenna is communicatively coupled to the RFID reader;

receiving, using the RFID antenna, returned radio wave from at least one RFID tag disposed on the at least one ball, the at least one RFID includes at least one sensor configured for detecting ball parameters associated with the at least one ball, the at least one sensor includes at least one location sensor, orientation sensor, force sensor, multiaxis accelerometer, altitude sensor, the at least one sensor is configured for generating sensor data;

generating, using the RFID reader, ball tracking data based on the returned radio wave, the RFID reader is communicatively coupled to the processing device, the ball tracking data includes the sensor data;

receiving, using the communication device, target data from at least one target sensor disposed on at least one target, the target having at least a point hole, and the at least one target sensor configured for detecting the presence of the at least one ball in the at least one target point hole;

retrieving, using a storage device, game data corresponding to the game type indication, the game data includes rules and scoring criteria;

processing, using the processing device, the ball tracking data and the target data based on the game data;

generating, using the processing device, user performance based on the processing, the user performance includes a score corresponding to the at least one user, performance parameters that include speed, accuracy, force, motion trajectory of the at least one ball kicked by the user;

transmitting, using the communication device, the user performance to the at least one user device; and storing, using the storage device, at least one of the request, the sensor data, the target sensor data, and the user performance.

18. The method as claimed in claim 17, wherein the user performance includes a score corresponding to the at least one user.

19. The method as claimed in claim 17, wherein the user performance includes performance parameters that include speed, accuracy, and force.

20. The method as claimed in claim 17, wherein the user performance includes performance parameters that include motion trajectory of the at least one ball kicked by the user.

* * * * *